H. A. BALLARD.
CLUTCH MECHANISM.
APPLICATION FILED JAN. 11, 1907. RENEWED MAY 20, 1913.
1,117,305.
Patented Nov. 17, 1914.
2 SHEETS—SHEET 1.
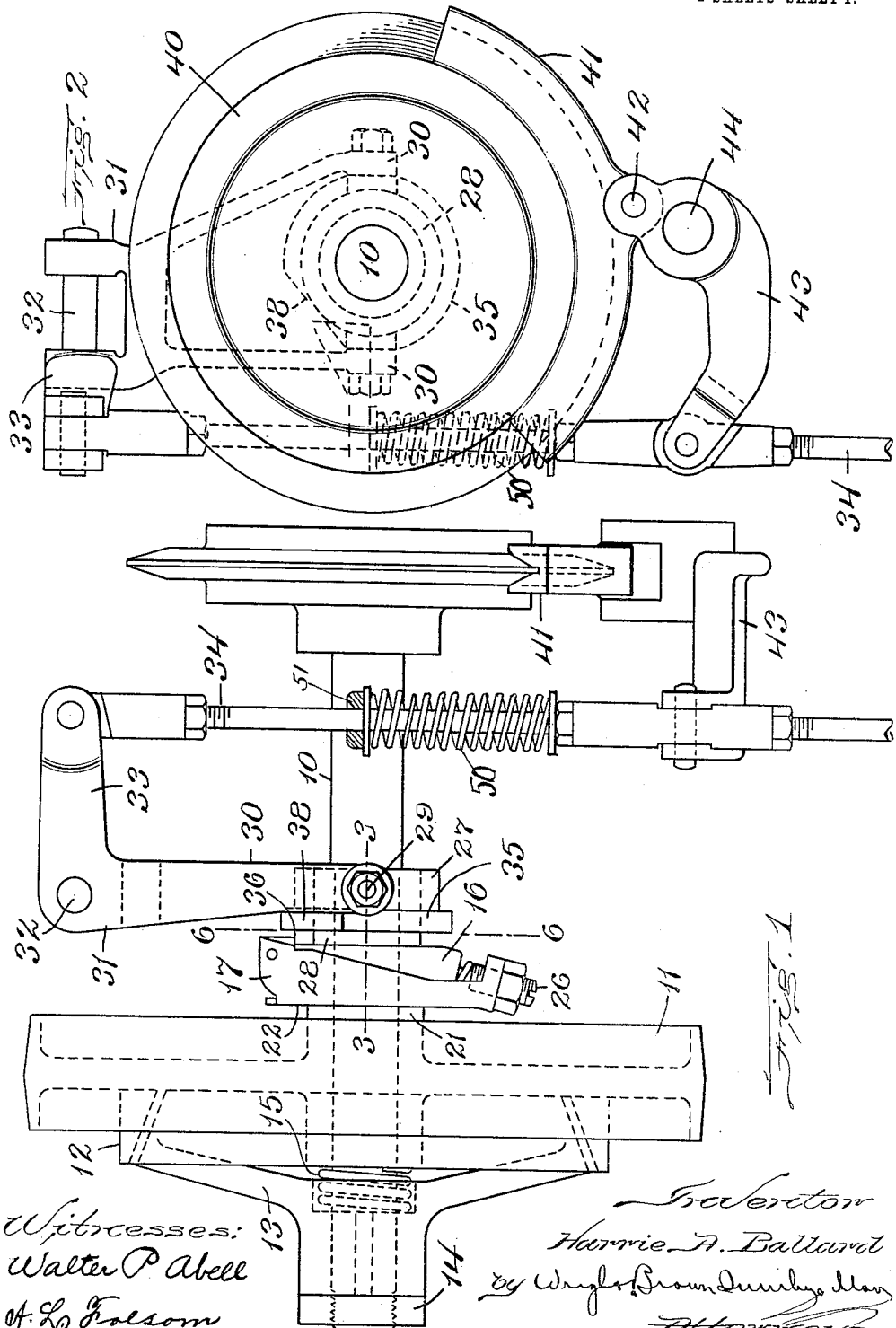

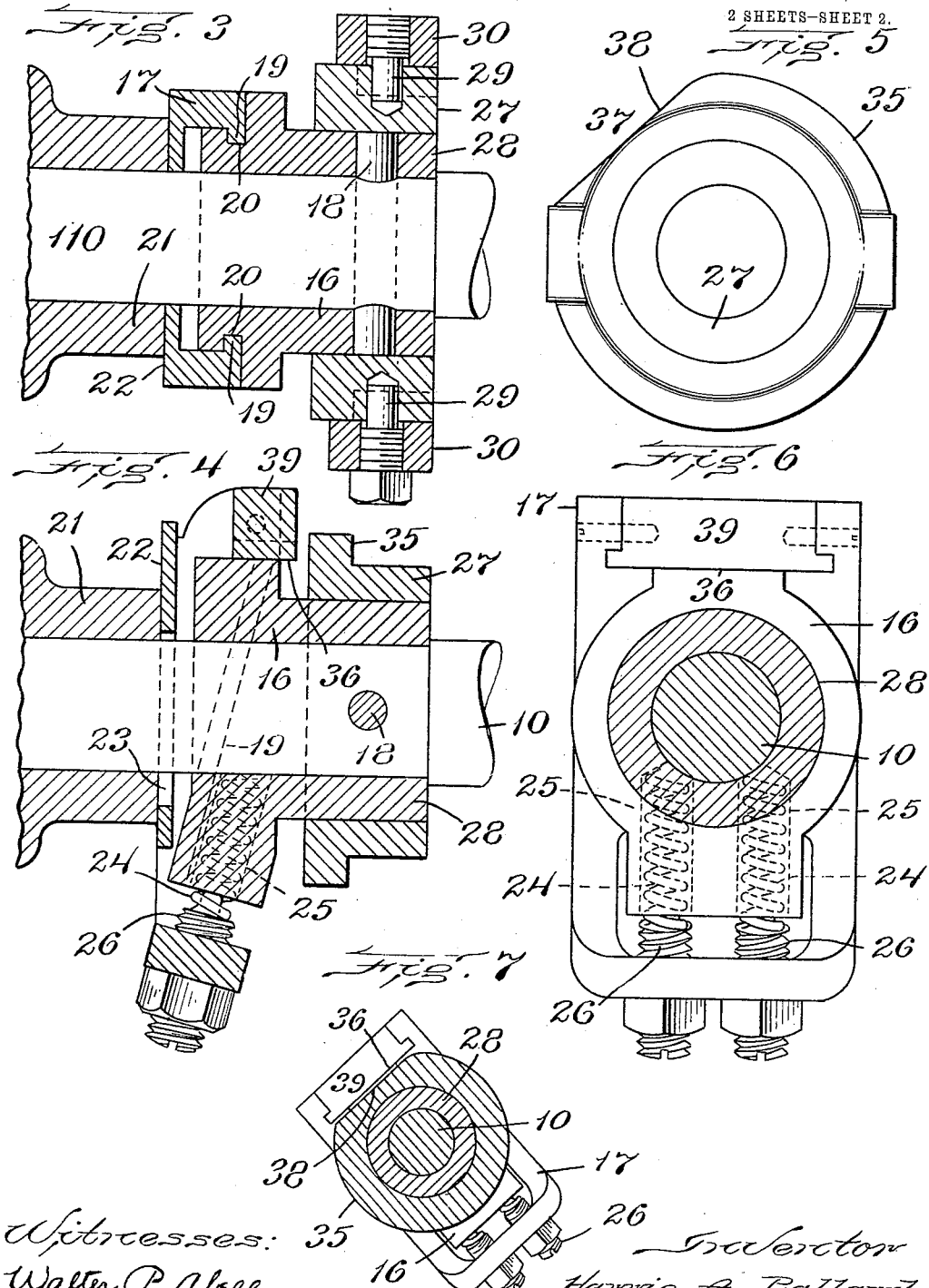

UNITED STATES PATENT OFFICE.

HARRIE A. BALLARD, OF SOMERVILLE, MASSACHUSETTS, ASSIGNOR TO THE BOYLSTON MANUFACTURING COMPANY, OF BOSTON, MASSACHUSETTS, A CORPORATION OF NEW JERSEY.

CLUTCH MECHANISM.

1,117,305. Specification of Letters Patent. Patented Nov. 17, 1914.

Application filed January 11, 1907, Serial No. 351,814. Renewed May 20, 1913. Serial No. 768,856.

*To all whom it may concern:*

Be it known that I, HARRIE A. BALLARD, of Somerville, in the county of Middlesex and State of Massachusetts, have invented certain new and useful Improvements in Clutch Mechanisms, of which the following is a specification.

This invention has relation to clutch-controlling mechanism which is adapted to rotate a shaft and to arrest the rotation thereof at a predetermined point.

The clutch herein shown and described is of the tapering friction cone type and is adapted to be controlled by manually operative means which is permitted to operate only when the clutch is at a predetermined position, and which then may operate so as to disconnect the coöperative clutch members at a predetermined point and apply a brake to the rotating parts.

The object of the present invention is to provide clutch-controlling mechanism which is designed to be inexpensive and yet more accurate and durable in its operation than those at present employed for work to which this is adapted.

Of the accompanying drawings forming a part of this specification,—Figure 1 is a side elevation of a driving clutch equipped with my improved controlling mechanism. Fig. 2 is an end elevation thereof. Fig. 3 is a sectional plan view taken on the line 3—3 of Fig. 1. Fig. 4 is a longitudinal vertical section of those parts included in Fig. 3. Fig. 5 is an elevation of the movable controller. Fig. 6 is a vertical section on the line 6—6 of Fig. 1. Fig. 7 is a similar view of the parts included in Fig. 6 but in another position and with the controller.

The same reference characters indicate the same parts wherever they occur.

10 indicates a rotatable shaft which in the present instance is adapted to be intermittently rotated by a pulley 11 loosely mounted thereon. Said pulley is not only adapted to rotate continuously about the shaft but is free to move axially thereon, and is provided with an annular flange 12 having an internal tapering face adapted to coöperatively engage the external tapering face of a cone member 13. It is not essential to this invention that the coöperating faces of the clutch members be conical or dependent upon friction to transmit motion from one to the other, since it would be within the bounds of possibilty to substitute therefor interlocking members or flat frictional disks or any other suitable type of transmission. The cone member 13 is keyed or otherwise fastened to the shaft 10 so as to rotate only therewith, and is not axially movable thereon except for the purpose of adjustment relatively to the flange 12. The said adjustment is effected by means of a nut or collar 14 screw-threaded upon the shaft so as to prevent receding of the member 13 from the flange 12, and against which the member 13 is at all times held by a spring 15. Said spring is coiled about the shaft between the hubs of the members 11 and 13 and exerts its pressure upon both members so as to normally force them apart.

The means for forcing the member 12 into coöperative relation with the member 13, in opposition to the spring 15, comprises a pair of coöperative members 16 and 17, of which the former is positively affixed upon the shaft 10 by means of the pin 18. The members 16 and 17 are connected by parallel interlocking inclined tongues 19 19 and grooves 20 20 of which the former are formed on the member 17 and the latter on the member 16. By reason of this form of connection the member 17 is adapted to move relatively to the member 16 and thereby to approach or recede from the clutch member 13. The member 17 has a flat face 22 which is transverse to the axis of the shaft and against which the hub 21 of the pulley is at all times held by the spring 15.

23 is an elongated hole in the member 17 through which the shaft extends and which permits movement of said member relatively thereto.

24 24 are helical compression springs contained in pockets 25 25 in the member 16, and which exert their force upon adjustable set-screws 26 26 carried by the member 17. The effect of the springs 24 24 is to normally move the member 17 so as to approach the clutch member 13 and thereby move the flange 12 of the pulley into operative engagement therewith. The force of the springs 24 24 when applied in this manner opposes and predominates over that of the spring 15, and it will be seen, therefore, that although the spring 15 normally tends to disengage the clutch members, the springs 24

24 normally tend to force said members into coöperative engagement irrespective of the spring 15.

A collar 27, hereinafter termed a "controller," coacts with the clutch-setting member 17 to move the latter transversely of the axis of rotation to release the clutch, and to hold said member away from clutch-setting position. Said controller is also a trip member, being movable to trip the member 17 so that the latter may be suddenly moved to clutch-setting position by its springs 24. The controller as shown is mounted upon the hub 28 of the member 16 but is free to move endwise upon said hub, the hub serving as a guide for such movement.

The controller 27 is movable axially to serve its purpose, but does not have rotative movement. Any suitable mechanism may be used to move the controller as stated, and while I have shown a form of mechanism which is well suited to my present needs, it is not to be understood that the invention is limited to the specific details thereof. The controller-operating mechanism, as shown, comprises studs 29 29 carried by a yoke or shipper 30. The yoke forms one arm of a bell-crank lever 31 fulcrumed upon a stud 32 and having another arm 33. The arm 33 is pivotally connected to a reciprocatory rod 34 which may be manually actuated in any desired way such as by a treadle (not shown).

The controller 27 is subject to the tension of a spring 50 which normally seeks to cause the release of the clutch. The spring surrounds the treadle rod 34 and is compressed between an abutment on the rod and a fixture 51 through which the rod slides.

35 is a peripheral flange formed on the controller and adapted to coöperatively engage a proturberance or shoulder 36 extending outwardly from the member 17. When the member 17 is in its normal or operative position the shoulder 36 is relatively near the axis of the shaft is shown by Fig. 4 and therefore is adapted when engaged by the end face of the flange 35 to arrest movement of the controller toward the clutch-setting members. But the circular continuity of the flange is interrupted by a gap 37, said gap being adapted to register with and clear the shoulder 36 when the member 17 is in the angular position shown by Fig. 7. In this position, but in no other, the controller may move in under the shoulder 36, and when the controller is so moved the shoulder may engage the cam face 38 of the flange and ride thereon until it rests upon the periphery of the flange. This causes a radial movement of the member 17, in opposition to the springs 24, 24, to clutch releasing position, whereupon the spring 15 moves the pulley 11 to disengage the flange 12 from the cone 13.

In order to arrest the rotation of the shaft when the clutch is disconnected, I provide a brake comprising a rotatable disk 40 affixed upon the shaft, and a brake shoe 41 adapted to coöperatively engage the disk. The shoe 41 is pivoted upon a pin 42 carried by an arm 43. Said arm is fulcrumed upon a fixed stud 44 and its extremity is pivotally connected to the manually operative rod 34 so that when the rod is moved to effect the release of the clutch, it also moves the brake shoe toward the disk 40. By reason of the hereinbefore described stoppage of the controller 27 by the shoulder 36, the full braking force of the shoe 41 is momentarily prevented, but immediately effected when the controller moves into operative position.

The clutch as shown by Fig. 1 is operatively connected for driving and the brake is released, the rod 34 presumably having just been manually raised and the member 17 having assumed clutch-setting position, although no substantial rotative movement of the clutch having occurred in consequence of the setting operation. If the manual force be immediately taken off, the spring 50 will depress the rod 34 until the end face of the flange 35 abuts against the confronting face of block 39. This abutting relation prevents braking action of the brake shoe 41; but the rod 34 and all parts operable thereby, being under the influence of spring 50, tend to move to clutch-releasing and brake-setting position, but are restrained by the block 39 until the member 17 has rotated to the angular position shown by Fig. 7. In this position the flange 35 is released by the block 39, and the spring 50 at this time acts to move the controller to clutch-releasing position under the block 39 and to also move the brake shoe 41 to braking position. Continued rotation of the member 17 causes the block 39 to ride up the cam surface 38 to the periphery of the flange 35, thus effecting the release of the clutch members. The spring resistance of the member 17 exerts a supplemental braking action. The driven member of the clutch may come to rest at any angular position with the block 39 upon the periphery of the flange 35; and whatever the angular position of rest may be, the clutch may be again set by retracting the flange 35 from and under block 39.

Having thus explained the nature of the invention and described a way of constructing and using the same, although without attempting to set forth all of the forms in which it may be made, or all of the modes of its use, I declare that what I claim is:—

1. Clutch mechanism comprising coactive disconnectible clutch members arranged for one to drive the other, spring means arranged to disconnect said members, spring means arranged to connect said clutch members notwithstanding the first-mentioned spring means, and a trip member arranged to coact with said clutch-connecting means to restrain the latter, said trip member being disengageable from said clutch-connecting means to effect a sudden and complete release of the same.

2. Clutch mechanism comprising a shaft, coöperative driving and driven clutch members respectively loose and tight thereon, a clutch setting member affixed on the shaft, a relatively movable coactive clutch-setting member arranged to act upon said loose driving member to clutch the same, said clutch setting members being connected by oblique sliding flanges, spring-tension means acting upon said movable clutch-setting member for operating the same, and a cam member movable to and from the path of said movable clutch-setting member, said cam member being adapted to divert said movable clutch-setting member from operative position to inoperative position.

3. Clutch mechanism comprising a shaft, coöperative driving and driven clutch members thereon, clutch setting means including coöperative members combined with the driven member so as to revolve in unison therewith and which coöperate by radial movement of one member, a spring by which the radially movable member is rendered active, and a controller by which the radially movable member may be rendered inactive.

4. Friction driving mechanism comprising a shaft, coöperative driving and driven friction members respectively loose and tight on the shaft adapted to be engaged and disengaged by axial movement of the driving member, clutch setting means rigidly connected with the driven friction member so as to revolve therewith and including an axially immovable member and a spring pressed member adapted to coöperate with the axially immovable member and with the loose friction member to set the latter, said axially immovable member and spring-pressed member being connected by oblique sliding flanges, and means for effecting movement of said spring-pressed member in opposition to the spring tension.

5. Clutch mechanism comprising a rotatable shaft, a driven member affixed thereto and having a friction face, a driving member loosely mounted on the shaft and having a coactive friction face adapted to engage the friction face of the driven member, an abutment on said shaft, yielding means movable transversely of the shaft and adapted to normally coact with said abutment to force the driving member into coöperative engagement with said driven member, and a manually controlled movable detent adapted to be moved into and out of the path of said yielding means and to render the latter inoperative.

6. Clutch mechanism comprising a rotatable shaft, a pair of coöperative clutch members mounted thereon, one of said members being affixed to the shaft and the other being revolubly and axially movable thereon, a pair of clutch setting members having relative movement and having coacting faces inclined with relation to said movement, one of said members being affixed to the shaft, and the other being movable transversely of the shaft and adapted to move said movable clutch member into engagement with the fixed clutch member, yielding means for rendering said clutch setting members active, and manually controlled means for effecting transverse movement of said transversely movable member in opposition to its yielding means, said manually controlled means being also movable to and from coactive position with said transversely movable member.

7. Clutch mechanism comprising a rotatable shaft, a pair of coöperative clutch members mounted thereon, one of said members being affixed to the shaft and the other being revolubly and axially movable thereon, a pair of clutch-setting members having coöperative inclined faces, one of said members being affixed to the shaft, and the other being movable relatively thereto and adapted to engage said movable clutch member and move it into coöperative engagement with the affixed member, yielding means tending to so actuate said movable clutch-setting member, a shoulder on said movable clutch-setting member, a controller movable toward and from and independently of said movable clutch-setting member and having an inclined face adapted to be engaged by said shoulder and to thereby move said clutch-setting member in opposition to its yielding actuating means when the latter are in rotation, manually operative means for supporting and moving said controller, and a subordinate spring tending to disengage said clutch members, one from the other.

8. Clutch mechanism comprising coactive disconnectible clutch members arranged for one to drive the other, spring means arranged to disconnect said members, spring means arranged to connect said clutch members notwithstanding said disconnecting means, and spring mechanism arranged to move said clutch-connecting means to release said clutch members, said spring mechanism being manually movable to trip said clutch-connecting means.

9. Clutch mechanism comprising coactive disconnectible clutch members arranged for one to drive the other, a spring device arranged to connect said clutch members, said device being connected to the driven clutch member to rotate therewith, and non-rotary means arranged to coact with said device in a predetermined angular position of the latter to retract said device from clutch connecting position, said retracting means being movable to trip said device.

10. Clutch mechanism comprising coactive driving and driven clutch members one of which is movable toward and from the other, coactive clutch-setting members connected to said driven clutch member to be rotated thereby, one of said clutch-setting members being movable relatively to the other and one of said clutch-setting members having a wedge surface adapted to set said clutch members, a spring carried by said clutch-setting members and arranged to move said relatively movable clutch-setting member to cause said wedge surface to act as aforesaid, and a controller movable to and from engagement with said relatively movable clutch-setting member, said controller being adapted to be ridden by the last mentioned clutch-setting member and to cause clutch releasing movement of the latter in consequence of being so ridden.

In testimony whereof I have affixed my signature, in presence of two witnesses.

HARRIE A. BALLARD.

Witnesses:
CHARLES S. JOHNSON,
A. L. FOLSOM.